(12) United States Patent  
Li (10) Patent No.: US 9,135,313 B2  
(45) Date of Patent: Sep. 15, 2015

(54) PROVIDING A SEARCH DISPLAY ENVIRONMENT ON AN ONLINE RESOURCE

(75) Inventor: Youlin Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/600,697

(22) Filed: Aug. 31, 2012

(65) Prior Publication Data

US 2015/0193509 A1    Jul. 9, 2015

(51) Int. Cl.
| | |
|---|---|
| G06F 7/00 | (2006.01) |
| G06F 17/30 | (2006.01) |
| G06F 3/0486 | (2013.01) |
| G06F 3/0482 | (2013.01) |

(52) U.S. Cl.
CPC ........ *G06F 17/30554* (2013.01); *G06F 3/0482* (2013.01); *G06F 3/0486* (2013.01); *G06F 17/30864* (2013.01)

(58) Field of Classification Search
CPC .................................................. G06F 3/0486
USPC ....................................................... 707/712
See application file for complete search history.

(56) References Cited

U.S. PATENT DOCUMENTS

| | | | | |
|---|---|---|---|---|
| 2007/0162422 | A1* | 7/2007 | Djabarov | 707/2 |
| 2009/0049031 | A1* | 2/2009 | Hepburn | 707/5 |
| 2011/0040745 | A1* | 2/2011 | Zaydman et al. | 707/714 |
| 2011/0219291 | A1* | 9/2011 | Lisa | 715/207 |

OTHER PUBLICATIONS

Wild Apricot Membership Software & Website Software 'Rich Media Research Tool for Your Website (online). (retrieved on Aug. 31, 2012). Retrieved from the Internet electronic mail: http://www.wildapricot.com/blogs/newsblog/2010/08/13/rich-media-search-tool-for-your-website, 3 pages.

* cited by examiner

*Primary Examiner* — Hosain Alam  
*Assistant Examiner* — Van Oberly  
(74) *Attorney, Agent, or Firm* — Fish & Richardson P.C.

(57) ABSTRACT

Methods, and systems, including computer programs encoded on computer-readable storage mediums, including a method for providing a search display environment on an online resource in response to an indication that a search operation is to be performed using a content object selected from the online resource. The method includes displaying an online resource; receiving a first selection indication that one of the content objects has been selected; receiving a second selection indication that a search operation using the selected content object is to be performed; in response to receiving the second selection indication: displaying a search display environment on the online resource, the display of the online resource being subordinate to the display of the search display environment; receiving search results responsive to the search operation; and displaying the search results in the search display environment.

19 Claims, 5 Drawing Sheets

PROVIDING A SEARCH DISPLAY ENVIRONMENT ON AN ONLINE RESOURCE

BACKGROUND

This specification generally relates to information presentation.

The Internet provides access to a wide variety of online resources. For example, online resources such as web pages for particular subjects or particular news articles, as well as image, video and/or audio files are accessible over the Internet. Search engines are available for identifying particular online resources accessible over the Internet. For example, online resources such as web pages that satisfy a user's informational needs can be identified by a search process in which keywords or other data are processed to identify a set of relevant web pages. Each online resource is identified to the user by a search result. A search result references a corresponding online resource that a search engine determines to be responsive to a respective search query. A search result typically includes the title of the online resource, a snippet of text or a portion of an image extracted from the online resource, and the URL of the online resource.

SUMMARY

In general, one aspect of the subject matter described in this specification can be implemented in methods that include displaying an online resource comprising content objects, each of the content objects having a display location defining a location of the content object as displayed on the online resource relative to display locations of other content objects as displayed on the online resource; receiving a first selection indication indicating that one of the content objects has been selected; receiving a second selection indication indicating that a search operation using the selected content object as an input is to be performed, the second selection indication being a translation of the selected content item; in response to receiving the second selection indication: displaying a search display environment on the online resource, wherein the display of the online resource is subordinate to the display of the search display environment, and a first portion of the online resource is obscured by the display of the search environment, and a second portion of the online resource is not obscured by the display of the search display environment and is displayed concurrently with the search display environment; receiving search results responsive to the search operation; and displaying the search results in the search display environment.

Other embodiments of this aspect include corresponding systems, apparatus, and computer programs, configured to perform the actions of the methods, encoded on computer storage devices.

These and other embodiments can each optionally include one or more of the following features. The method can include receiving an indication that the one of the content objects has been highlighted. The search operation can include providing search query results responsive to the selected content object and the method can include receiving an indication that one of the search query results has been selected; requesting a resource referenced by the selected search query result, and in response to receiving the resource, displaying the resource in a results display environment.

The search operation can include providing search query suggestions for search queries related to the selected content object and the method can include receiving an indication that one of the search query suggestions has been selected, requesting a resource including search query results responsive to the selected search query suggestion, and in response to receiving the resource, displaying the resource in a results display environment.

The method can include displaying a drop box, in the search display environment, in which the selected content object can be dropped, receiving a drop indication indicating that the selected content object has been dropped into the drop box, and receiving the search results in response to receiving the drop indication.

The method can include de-emphasizing the display of the online resource relative to the display of the search display environment. The method can include dimming the display of the online resource relative to the display of the search display environment. The method can also include determining one or more keywords for the selected content object and receiving the search results that are responsive to the one or more keywords. The method can include receiving an indication that the selected content object has been dragged from its display location to a different display location.

Particular implementations of the subject matter described in this specification can be implemented to realize one or more or none of the following advantages. Search results, each referencing a resource that is relevant to selected content in an online resource (e.g., web page), are provided in a search display environment displayed on/with the online resource in response to an indication that a user desires to perform a search operation for the selected content (e.g., web page text). The display of the online resource is subordinate to the display of the search display environment (e.g., the display of the online resource is dimmed relative to the display of the search display environment). As the search results are presented in the search display environment, which is displayed on/with the online resource, the search results are presented with the online resource to provide additional context for the search results as the online resource includes the content object to which the search results are responsive.

As the display of the online resource is subordinate to the display of the search display environment, the search results are emphasized with respect to the online resource to facilitate quick and efficient identification and consumption of the search results.

Further, as the search results are provided in the search display environment on/with the online resource, the user's user device is not required to navigate away from the online resource to present the search results, which expedites the process of the user evaluating the search results. Moreover, as the search display environment is displayed on/with the online resource, when the user is finished with the search results, the user can access the still displayed (but de-emphasized) online resource without requiring the user's user device to navigate from a search results resource back to the online resource, which reduces user device system processing and bandwidth requirements.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This description generally relates to providing a search display environment on an online resource in response to a first indication that a content object in the online resource has been selected and a second indication that a search operation is to be performed using the selected content object. For example, in response to a user highlighting text, which is a content object of a web page, which is an online resource, and dragging the highlighted text, a search display environment/window is displayed over a portion of the display of the web page.

The search display environment includes, for example, search results responsive to the highlighted text or includes search query suggestions for search queries relevant to the highlighted text, depending on the implementation. In some implementations, the display of the web page is de-emphasized relative to the display of the search display environment. For example, the display of the web page is dimmed relative to the display of the search window. A user can, as the case may be, select a search result in the search display environment to access the online resource referenced by the search result or select a search query suggestion in the search display environment to access a search results page for the search query suggestion.

Figure 1:
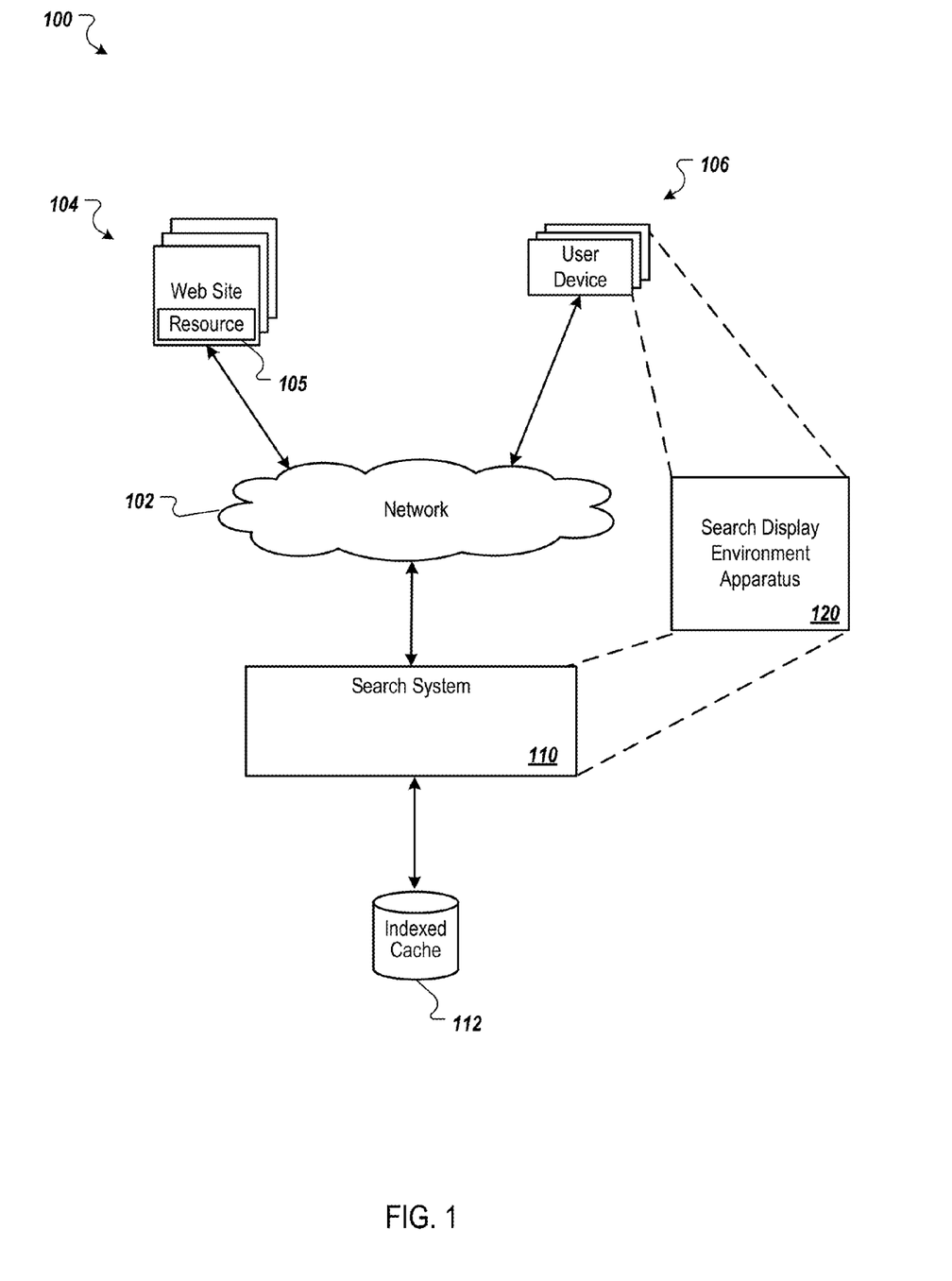
FIG. 1 is a block diagram of an example environment in which a search display environment apparatus can be implemented.

FIG. 1 is a block diagram of an example environment 100 in which a search display environment apparatus 120 can be implemented. A computer network 102, such as a local area network, "LAN," wide area network, "WAN," the Internet, or a combination thereof, connects web sites 104, user devices 106, and the search system 110. The example environment 100 may include multiple web sites 104 and user devices 106.

A web site 104 is a one or more online resources 105 associated with a domain name. A web site 104 can be hosted by one or more servers. An example web site 104 includes a collection of online resources (e.g., web pages) formatted in hypertext markup language, "HTML," that contains text, graphic images, multimedia content, and programming elements, such as scripts. In some implementations, a web site 104 is maintained by a publisher, e.g., an entity that manages and/or owns the web site.

An online resource 105 is any data that is provided by a web site 104 over the network 102 and associated with a resource address. For example, online resources 105 include HTML pages, word processing documents, images, and videos. The online resources 105 can include content, such as, text, pictures, and so on, and may include embedded information, such as meta information, e.g., metadata, and hyperlinks, and/or embedded instructions such as scripts.

A user device 106 is an electronic device that is under the control of a user and capable of requesting and/or receiving online resources 105 over the network 102. Example user devices 106 include personal computers, mobile communication devices, and other devices that can send and/or receive data over the network 102. A user device 106 typically includes a user application, such as a web browser, to facilitate the sending and receiving of data over the network 102. The web browser can enable a user device 106 to display text, images, videos, music and other information typically located on an online resource at a website on the World Wide Web or a local area network. In some implementations, a user may be allowed to interact with the displayed content using a user device 106.

To facilitate searching of these online resources 105, the search system 110 can identify the online resources 105 by crawling the web sites 104 and indexing the online resources 105 provided by or available from the web sites 104. The indexed and, optionally, cached copies of the online resources 105 can be stored in an indexed cache data store 112.

User devices 106 can submit search queries to the search system 110. The search queries can be submitted to the search system 110 in the form of a search request that includes the search query. In response to the search request, the search system 110 can use data in the indexed cache data store 112 to identify online resources 105 that are relevant to the search queries. The search system 110 identifies the online resources 105 in the form of search results and returns the search results to the user devices 106 in a search results page. A search result can be data generated by the search system 110 that identifies an online resource 105 that satisfies a particular search query, and includes a resource locator for the online resource 105. An example search result can include any, or a combination, of an online resource title, a snippet of text extracted from the online resource, a thumbnail of an image when the search is for images, and a universal resource locator "URL," of the online resource that includes the snippet of text and/or the image.

The search results can be ranked based on scores related to the resources 105 identified by the search results, such as information retrieval, "IR," scores. In some implementations an IR score can be based on a quality of the resource 105 and a relevancy of the resource 105. Various search algorithms can be used to compute these search scores. The search results can be ordered according to these scores and provided to the user device 106 according to the order.

The user devices 106 receive the search results on search results pages and render the pages for presentation to users. In response to a user selecting a search result at a user device 106, the user device 106 requests the online resource identified by the resource locator included in the selected search result. The server hosting a web site 104 associated with the online resource 105 receives the request for the online resource 105 from the user device 106 and provides the online resource 105 to the requesting user device 106.

As will be described below, the search display environment apparatus 120 provides a search display environment for display on an online resource in response to certain indications, such as user indications in the form of user inputs to a user device 106. As used herein, a search display environment displayed on or with an online resource 105 describes the display of an overlay on the online resource. An overlay obscures a portion of the online resource 105 over which it overlays. For example, in some implementations, the search display environment can be considered to be displayed in the foreground and the online resource 105 that it overlays can be considered to be displayed in the background.

In some implementations, the search display environment apparatus 120 can be implemented by the search system 110, or in a web browser application running on a user device 106 that includes instructions that facilitate the implementation of the search display environment apparatus 120, or a combination thereof. In the case of a web browser application, the instructions can be provided in a variety of different ways. For example, the instructions can be part of the web browser executable, can be provided by a web browser plug-in or a toolbar application, or can be in the form of a script of the online resource 105. For convenience, when the search display environment apparatus 120 is described as performing an action, such a description can be interpreted as the search display environment apparatus 120 causing a user device 106 to perform the action. The operation of the search display environment apparatus 120 is described below with reference to FIGS. 2A-2D.

Figure 2A:
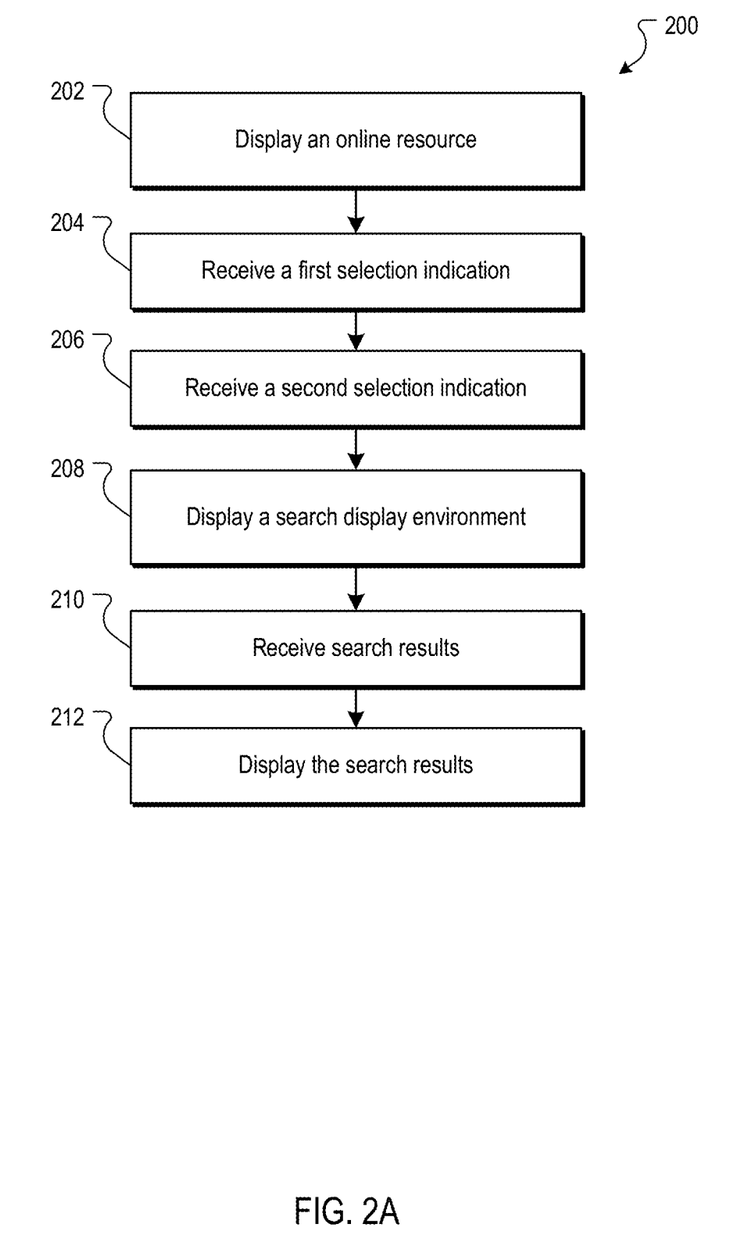
FIG. 2A is a flow diagram of an example process for provisioning a display of a search display environment on an online resource.
Figure 2B:
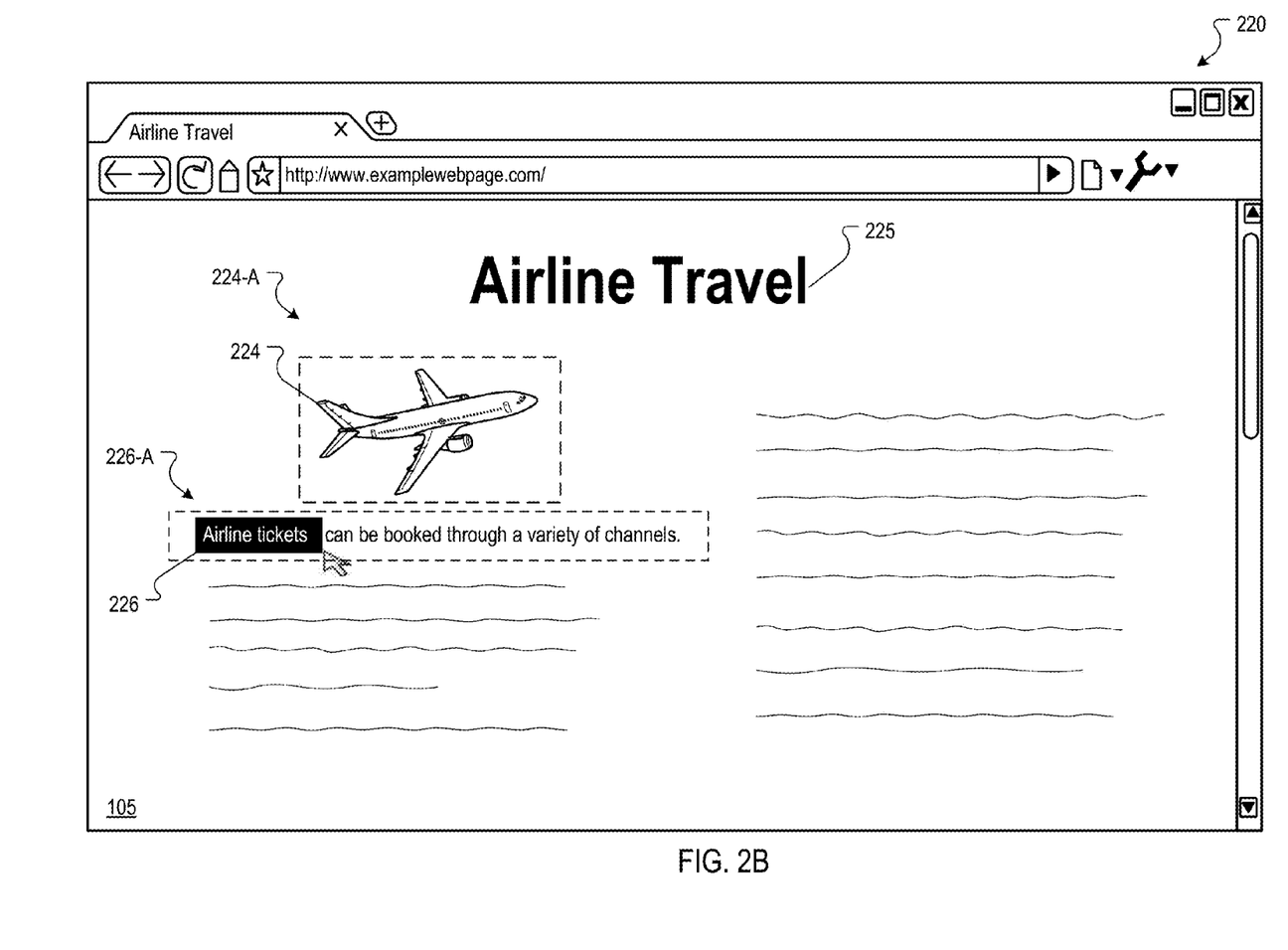
FIG. 2B is an illustration of an example screenshot of an online resource.

FIG. 2A is a flow diagram of an example process 200 for provisioning a display of a search display environment on an online resource 105. The process 200 displays an online resource comprising content objects (202). A content object is an element displayed on an online resource 105 when the online resource 105 is rendered by a user device 106, and each content object is selectable or individually identifiable. For example, content objects include text (e.g., a character, term, word, sentence), images (or other graphics), videos, tables and charts to name a few. A content object is selectable or individually identifiable if the content item can be set apart or otherwise distinguished from other content objects on the online resource 105 through user interaction with the content object (e.g., highlighting or "clicking on" the content object). In some implementations, a user device 106 displays the online resource 105. An exemplary online resource is shown in FIG. 2B, which is an illustration of an example screenshot 220 of an online resource 105 (as displayed by a user device 106).

The online resource 105 includes multiple content objects. For example, the online resource 105 includes an image of an airplane 224, a title 225 "Airline Travel" and other text including text 226 "Airline tickets can be booked through a variety of channels." Each of the content objects has a display location defining a location of the content object as displayed on the online resource 105 relative to the display locations of other content objects as displayed on the online resource 105. For example, the display location 224-A of the image 224 is above the text 226 and below the title 225 as displayed on the screenshot 220.

The process 200 receives a first selection indication indicating that one of the content objects has been selected (204). In some implementations, the search display environment apparatus 120, implemented in a user device 106 in web browser software, receives the first selection indication. The first selection indication can be, for example, an indication of a user's interest in a content object(s) on the online resource 105 based on the user's interaction with/selection of the content object(s) of interest. Such an interaction or selection can be in the form of, for example, a user causing the content object(s) of interest to be highlighted or clicked on (through use of a mouse or other input device) or otherwise identified. By way of an example, with reference to the online resource 105, the search display environment apparatus 120 receives the first selection indication that the text "Airline tickets" has been selected in response to that text (e.g., content object) being highlighted.

Figure 2C:
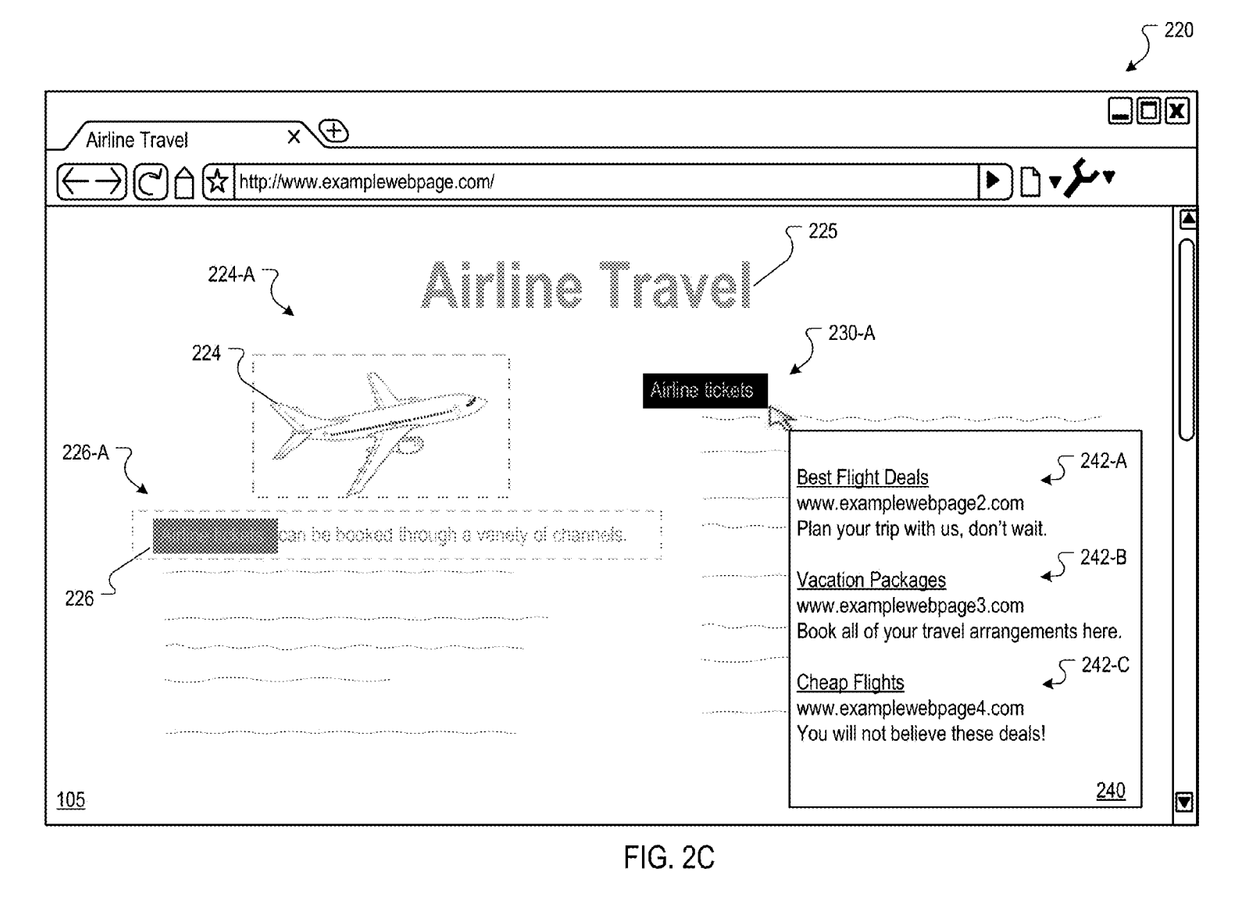
FIG. 2C is an illustration of an example screenshot of a search display environment displayed on an online resource.

The process 200 receives a second selection indication indicating that a search operation using the selected content object as an input is to be performed (206). In some implementations, the search display environment apparatus 120 receives the second selection indication. In some implementations, the second selection indication is a translation of the selected content object. For example, a translation of the selected content object can be a user interaction with the selected content object(s) in the form of a user causing the selected content object(s) to be dragged or otherwise "moved" (through use of a mouse or other input device) from its display location to another, different display location, or can be another type of manipulation of the selected content object. In some implementations, other second selection indications are also possible, for example, clicking or double clicking on the selected content object (e.g., from the first selection indication), causing the cursor to hover over the selected content object for a threshold time period, dropping/moving the selected content object into a "drop box" or other designated element or area, or some combination thereof. With reference to FIG. 2C, which is an illustration of an example screenshot of a search display environment displayed on an online resource, the search display environment apparatus 120, for example, receives a second selection indication in response to the selected text 226 (e.g., "Airline tickets") being dragged from its display location 226-A to the display location 230-A (e.g., caused by a user interaction with a mouse dragging the selected text 226).

In some implementations, the search operation can be, for example, the search display environment apparatus 120 providing or accessing for display search query results responsive to the selected content object (e.g., search query results responsive to the selected text 226 submitted as a search query), providing or accessing for display search query suggestions specifying suggestions for search queries related to the selected content object (e.g., search query suggestions for a search query based on the text from the selected text 226), or a combination thereof. In some implementations, the search operation is user selectable. For example, in the case the search display environment apparatus 120 is implemented in a toolbar in a web browser application, the toolbar can include an interactive menu or selectable button(s) that allow a user to set which search operations are to be performed in response to the search display environment apparatus 120 receiving the second selection indication, as described below.

The process 200, in response to receiving the second selection indication, displays a search display environment on the online resource (208). In some implementations, the search display environment is an overlay environment overlaying the online resource 105 such as, for example, a pop-up window or an iFrame. In some implementations, when the search display environment apparatus 120 instantiates the search display environment in response to receiving the second selection indication (e.g., only in response to receiving the second selection indication), the search display environment apparatus 120 causes the display of the online resource 105 to be subordinate to the display of the search display environment.

With reference to FIG. 2C, the search display environment apparatus 120 can cause the display of the online resource 105 to be subordinate to the display of the search display environment 240 by, for example, de-emphasizing the display of the online resource 105 relative to the display of the search display environment 240. In some implementations, such de-emphasizing can include dimming the display of the online resource 105 relative to the display of the search display environment 240, moving the display of the online resource 105 to the background and displaying the search display environment 240 in the foreground, to name just a few.

In some implementations, the search display environment apparatus 120 instantiates the search display environment 240 proximate to the display location to which the selected content object was moved (e.g., dragged). For example, the search display environment apparatus 120 instantiates the search display environment 240 proximate to the display location 230-A. Thus the location on the resource at which the search display environment 240 is instantiated and displayed can be dependent on the display location to which the selected content object was moved. In other implementations, the search display environment 240 is instantiated and displayed at a static location on the online resource 105 (e.g., the bottom or bottom-right corner of the online resource 105 independent of where the selected content object was moved).

In some implementations, the search display environment 240 and the online resource 105 are concurrently displayed as the search display environment 240 is an overlay on the online resource 105. As the search display environment 240 is an overlay on the online resource 105, a first portion of the online resource 105 (e.g., the portion of the online resource 105 over which the search display environment 240 overlays) is obscured by the display of the search environment 240 while a second portion of the online resource 105 (e.g., the portion of the online resource 105 over which the search display environment 240 does not overlay) is not obscured by the display of the search display environment 240. In some implementations, the search display environment 240 can be opaque or substantially opaque such that the first portion of the online resource 105 is entirely or substantially obscured. In other implementations, the search display environment 240 can be partially transparent such that the first portion of the online resource 105 is at least partly visible or discernable through the search display environment 240.

The process 200, in response to receiving the second selection indication, receives search results responsive to the search operation (210). In some implementations, the search display environment apparatus 120, in response to receiving the second selection indication (e.g., an indication that the selected content object has been moved/dragged), sends a search request including the selected content object or keywords associated with the selected content object to the search system 110. In response to receiving the search request, the search system 110 sends search results responsive to the search operation for the selected content object to the search display environment apparatus 120. For example, the search display environment can be a "drop box" (e.g., an interactive web element into which content objects can be "dropped" after the content objects have been moved from their respective display locations). In response to receiving a drop indication indicating that the selected content object has been dropped into the drop box, the search display environment apparatus 120 sends the search request to the search system 110 and, in turn, the search system 110 provides the responsive search results.

As described above, the search operation can be, for example, the provision of search query results responsive to the selected content object, the provision of search query suggestions specifying suggestions for search queries related to the selected content object, or a combination thereof. For example, with reference to FIG. 2C, the search display environment 240 includes search results 242 that are search query results 242 responsive to the selected text 226 "Airline tickets." The search query results 242 include, for example, search query results 242-A "Best Flight Deals," 242-B "Vacation Packages" and 242-C "Cheap Flights." Although search results 242 include three search results, more or less search results can be provided (e.g., two search results or five search results).

In some implementations, the search display environment apparatus 120 can receive an indication that one of the search query results 242 has been selected (e.g., that a user has clicked on a search query result 242). In response, the search display environment apparatus 120 requests an online resource referenced by the selected search query result 242. For example, the search display environment apparatus 120 requests a web page (e.g., resource) referenced by the search query results 242 from the server hosting the web page. In response to receiving the requested online resource, the search display environment apparatus 120 displays the requested online resource in a results display environment on the user device 106. For example, the results display environment can be an instantiation of another web browser window (e.g., different from the web browser window displaying the online resource 105 and the search display environment 240), a pop up window or an iFrame (e.g., on the online resource 105), or another display environment.

Figure 2D:
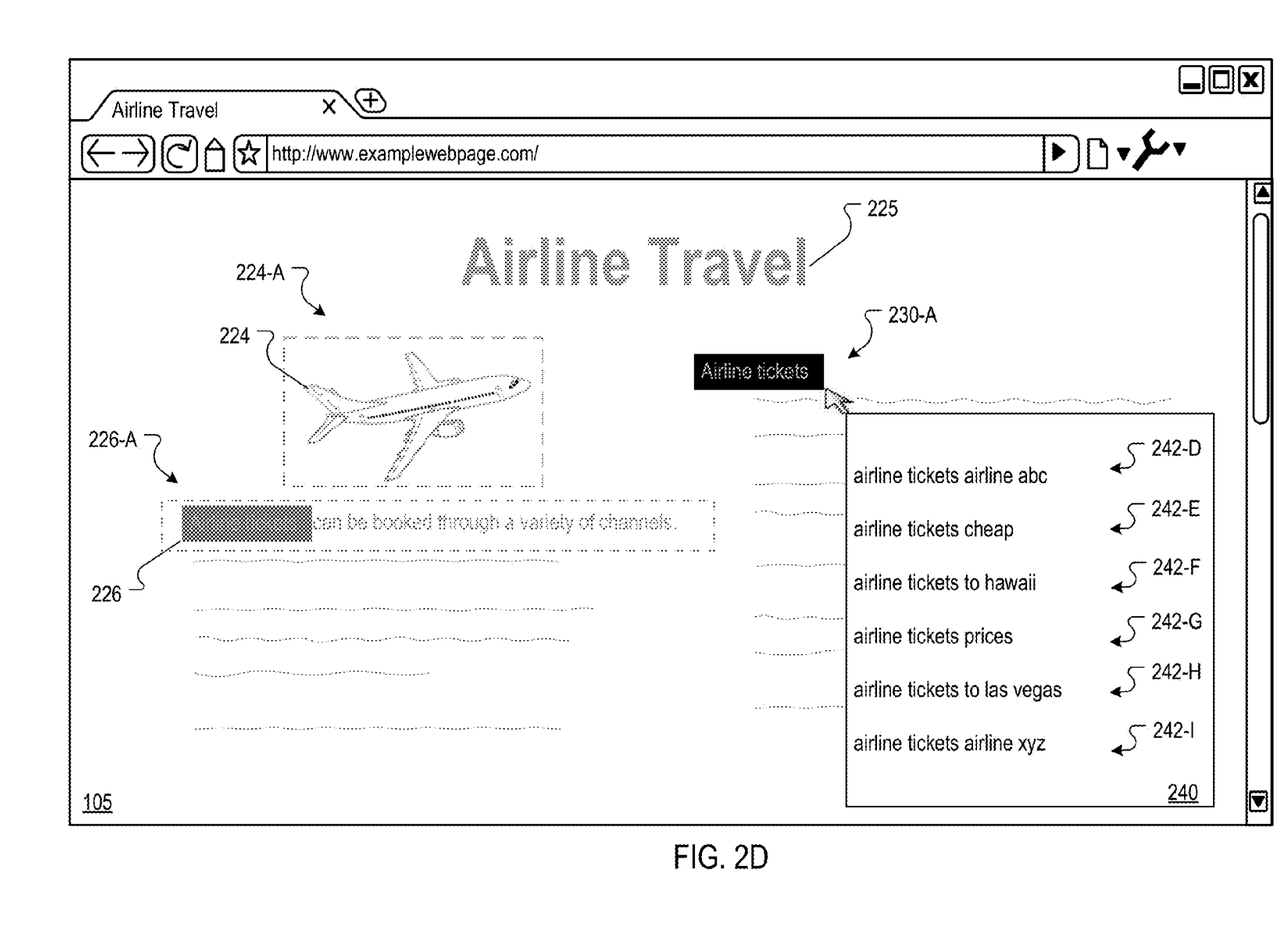
FIG. 2D is an illustration of another example screenshot of a search display environment displayed on an online resource.

By way of another example, with reference to FIG. 2D, the search display environment 240 includes search results 242 that are search query suggestions 242 for search queries related to the selected text 226 "Airline tickets." The search query suggestions 242 include, for example, search query suggestions 242-D "airline tickets airline abc," 242-E "airline tickets cheap," 242-F "airline tickets to hawaii," 242-G "airline tickets prices," 242-H "airline tickets to las vegas" and 242-I "airline tickets airline xyz." Although search query suggestions 242 include six search query suggestions 242, more or less search query suggestions 242 can be provided (e.g., four search query suggestions 242 or eight search query suggestions 242).

In some implementations, the search display environment apparatus 120 can receive an indication that one of the search query suggestions 242 has been selected (e.g., that a user has clicked on a search query suggestion 242). In response, the search display environment apparatus 120 requests an online resource including search query results responsive to the selected search query suggestion 242. For example, the search display environment apparatus 120 requests a search results web page (e.g., online resource) including search query results responsive to the selected search query suggestion 242 from the search system 110. In response to receiving the requested online resource, the search display environment apparatus 120 displays the requested online resource in a results display environment on the user device 106. For example and similar to that described above, the results display environment can be an instantiation of another web browser window (e.g., different from the web browser window displaying the online resource 105 and the search display environment 240), a pop up window or an iFrame (e.g., on the online resource 105), or another display environment.

As described above, content objects can include not only text but also, for example, images (or other graphics), videos, tables and charts. In some implementations, to generate the search request to request search results 242 for the selected content object, the search display environment apparatus 120 determines keywords for the selected content object. For example, with respect to content objects that include text, the search display environment apparatus 120 can include all or some of the text in the search request or perform a semantic analysis on the text to identify keywords for the text to send in the search request (e.g., the keywords may be the same or different from words in the text).

By way of another example, with respect to content objects that include an image, the search display environment apparatus 120 can use various image processing techniques (e.g., scale invariant feature transform (SIFT), edge detection, interest point detection, pixel matching) to identity the subject matter of the image and use the determined subject matter as the keywords for the content object. In some implementations, the search display environment apparatus 120 can parse the images' metadata and determine keywords based on the parsed metadata. With respect to content objects that include a table or chart, the search display environment apparatus 120 can, for example, identify the title of the table or chart and determine the keywords for the content object to be the title. Thus, in some implementations, the search results 242 received by the search display environment apparatus 120 are the search results 242 responsive to the keywords for the selected content object.

Although in some implementations the search display environment apparatus 120 can determine keywords for the selected content object and include such keywords in the search request, in other implementations, the search display environment apparatus 120 does not determine keywords for the selected content object but rather includes the selected content object in the search request. In turn, any necessary keyword determination is performed by the search system 110.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device. Data generated at the user device, e.g., a result of the user interaction can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    displaying an online resource having a particular resource address, the online resource comprising content objects, each of the content objects having a display location defining a location of the content object as displayed on the online resource relative to display locations of other content objects as displayed on the online resource;
    receiving a first selection indication indicating that one of the content objects has been selected;
    receiving a second selection indication indicating that a search operation using the selected content object as an input is to be performed, the second selection indication being an indication that the selected content object has been dragged from its display location on the online resource to a different display location on the online resource, the different display location determined by the user and not dependent on a designated area on the online resource;
    in response to receiving the second selection indication:
        displaying a search display environment on the online resource at a location dependent on the different display location to which the selected content item was dragged and proximate to the different display location to which the selected content item was dragged, wherein the display of the online resource is subordinate to the display of the search display environment, and a first portion of the online resource is obscured by the display of the search environment, and a second portion of the online resource is not obscured by the display of the search display environment and is displayed concurrently with the search display environment;
        receiving search results responsive to the search operation; and
        displaying the search results in the search display environment on the online resource at the location on the online resource that is proximate to the different display location to which the selected content item was dragged.

2. The method of claim 1, wherein receiving a first selection indication comprises:
    receiving an indication that the one of the content objects have been highlighted.

3. The method of claim 1, wherein the search operation comprises providing search query results responsive to the selected content object and the search results are the search query results, the method further comprising:
    receiving an indication that one of the search query results has been selected;
    requesting a resource referenced by the selected search query result; and
    in response to receiving the resource, displaying the resource in a results display environment.

4. The method of claim 1, wherein the search operation comprises providing search query suggestions specifying suggestions for search queries related to the selected content object and the search results are the search query suggestions, the method further comprising:
    receiving an indication that one of the search query suggestions has been selected;
    requesting a resource including search query results responsive to the selected search query suggestion; and
    in response to receiving the resource, displaying the resource in a results display environment.

5. The method of claim 1, wherein displaying the search display environment comprises de-emphasizing the display of the online resource relative to the display of the search display environment.

6. The method of claim 5, wherein de-emphasizing the display of the online resource comprises:
    dimming the display of the online resource relative to the display of the search display environment.

7. The method of claim 1, further comprising:
determining one or more keywords for the selected content object; and
wherein receiving the search results responsive to the search operation comprises receiving the search results that are responsive to the one or more keywords.

8. The method of claim 1, wherein displaying a search display environment on the online resource at a location dependent on the different display location to which the selected content item was dragged and proximate to the different display location to which the selected content item was dragged comprises displaying the selected content item at the display location to which it was dragged in conjunction with displaying the search result environment.

9. A system comprising:
one or more data processors; and
instructions stored on a computer storage apparatus that when executed by the one or more data processors cause the one or more data processors to perform operations comprising:
displaying an online resource having a particular resource address, the online resource comprising content objects, each of the content objects having a display location defining a location of the content object as displayed on the online resource relative to display locations of other content objects as displayed on the online resource;
receiving a first selection indication indicating that one of the content objects has been selected;
receiving a second selection indication indicating that a search operation using the selected content object as an input is to be performed, the second selection indication being an indication that the selected content object has been dragged from its display location on the online resource to a different display location on the online resource, the different display location determined by the user and not dependent on a designated area on the online resource;
in response to receiving the second selection indication:
displaying a search display environment on the online resource at a location dependent on the display location to which the selected content item was dragged and proximate to the display location to which the selected content item was dragged, wherein the display of the online resource is subordinate to the display of the search display environment, and a first portion of the online resource is obscured by the display of the search environment, and a second portion of the online resource is not obscured by the display of the search display environment and is displayed concurrently with the search display environment;
receiving search results responsive to the search operation; and
displaying the search results in the search display environment on the online resource at the location on the online resource that is proximate to the different display location to which the selected content item was dragged.

10. The system of claim 9, wherein receiving a first selection indication comprises:
receiving an indication that the one of the content objects have been highlighted.

11. The system of claim 9, wherein the search operation comprises providing search query results responsive to the selected content object and the search results are the search query results, and the instructions, when executed by the one or more data processors, cause the one or more data processors to perform further operations comprising:
receiving an indication that one of the search query results has been selected;
requesting a resource referenced by the selected search query result; and
in response to receiving the resource, displaying the resource in a results display environment.

12. The system of claim 9, wherein the search operation comprises providing search query suggestions specifying suggestions for search queries related to the selected content object and the search results are the search query suggestions, and the instructions, when executed by the one or more data processors, cause the one or more data processors to perform further operations comprising:
receiving an indication that one of the search query suggestions has been selected;
requesting a resource including search query results responsive to the selected search query suggestion; and
in response to receiving the resource, displaying the resource in a results display environment.

13. The system of claim 9, wherein displaying the search display environment comprises de-emphasizing the display of the online resource relative to the display of the search display environment.

14. The system of claim 13, wherein de-emphasizing the display of the online resource comprises:
dimming the display of the online resource relative to the display of the search display environment.

15. The system of claim 9, wherein the instructions, when executed by the one or more data processors, cause the one or more data processors to perform further operations comprising:
determining one or more keywords for the selected content object; and
wherein receiving the search results responsive to the search operation comprises receiving the search results that are responsive to the one or more keywords.

16. The system of claim 9, wherein displaying a search display environment on the online resource at a location dependent on the different display location to which the selected content item was dragged and proximate to the different display location to which the selected content item was dragged comprises displaying the selected content item at the display location to which it was dragged in conjunction with displaying the search result environment.

17. A non-transitory computer-readable storage medium having instructions stored thereon, which, when executed by one or more data processors, causes the one or more processor to perform operations comprising:
displaying an online resource having a particular resource address, the online resource comprising content objects, each of the content objects having a display location defining a location of the content object as displayed on the online resource relative to display locations of other content objects as displayed on the online resource;
receiving a first selection indication indicating that one of the content objects has been selected;
receiving a second selection indication indicating that a search operation using the selected content object as an input is to be performed, the second selection indication being an indication that the selected content object has been dragged from its display location on the online resource to a different display location on the online resource, the different display location determined by the user and not dependent on a designated area on the online resource;

in response to receiving the second selection indication:
  displaying a search display environment on the online resource at a location dependent on the display location to which the selected content item was dragged and proximate to the display location to which the selected content item was dragged, wherein the display of the online resource is subordinate to the display of the search display environment, and a first portion of the online resource is obscured by the display of the search environment, and a second portion of the online resource is not obscured by the display of the search display environment and is displayed concurrently with the search display environment;
  receiving search results responsive to the search operation; and
  displaying the search results in the search display environment on the online resource at the location on the online resource that is proximate to the different display location to which the selected content item was dragged.

18. The non-transitory computer-readable storage medium of claim 17, wherein receiving a first selection indication comprises:
  receiving an indication that the one of the content objects have been highlighted.

19. The non-transitory computer-readable storage medium of claim 17, displaying a search display environment on the online resource at a location dependent on the different display location to which the selected content item was dragged and proximate to the different display location to which the selected content item was dragged comprises displaying the selected content item at the display location to which it was dragged in conjunction with displaying the search result environment.

* * * * *